(12) United States Patent
Wu et al.

(10) Patent No.: US 8,768,066 B2
(45) Date of Patent: Jul. 1, 2014

(54) METHOD FOR IMAGE PROCESSING AND APPARATUS USING THE SAME

(75) Inventors: Chia-Yu Wu, Taichung (TW);
Hong-Long Chou, Taipei (TW);
Chia-Chun Tseng, Hsinchu (TW)

(73) Assignee: Altek Corporation, Hsinchu (TW)

( * ) Notice: Subject to any disclaimer, the term of this patent is extended or adjusted under 35 U.S.C. 154(b) by 121 days.

(21) Appl. No.: 13/424,396

(22) Filed: Mar. 20, 2012

(65) Prior Publication Data
US 2013/0188874 A1    Jul. 25, 2013

(30) Foreign Application Priority Data

Jan. 20, 2012 (TW) .............................. 101102387 A

(51) Int. Cl.
*G06K 9/48* (2006.01)
(52) U.S. Cl.
USPC ........................................ 382/197; 348/208.1
(58) Field of Classification Search
CPC ............................... H04N 5/3572; G06K 9/48
USPC ........................................................ 382/197
See application file for complete search history.

(56) References Cited

U.S. PATENT DOCUMENTS

| | | | |
|---|---|---|---|
| 6,597,816 B1 * | 7/2003 | Altunbasak et al. ........... | 382/275 |
| 7,817,185 B2 * | 10/2010 | Kurata ....................... | 348/208.1 |
| 8,363,130 B2 * | 1/2013 | Mitsuya et al. ............... | 348/241 |
| 2009/0279609 A1 * | 11/2009 | De Haan et al. .......... | 375/240.16 |
| 2011/0019014 A1 * | 1/2011 | Oh et al. .................... | 348/208.4 |

FOREIGN PATENT DOCUMENTS

| TW | 201101849 | 1/2011 |
|---|---|---|
| TW | 201134193 | 10/2011 |
| TW | 201145992 | 12/2011 |

OTHER PUBLICATIONS

"Office Action of Taiwan Counterpart Application", issued on Feb. 19, 2014, pp. 1-9.

* cited by examiner

*Primary Examiner* — Samir Ahmed
*Assistant Examiner* — Totam Le
(74) *Attorney, Agent, or Firm* — Jianq Chyun IP Office

(57) ABSTRACT

An image processing method and an apparatus using the same are provided. The method includes the following steps: deriving a global motion vector between a first image and a second image and providing the first image, the second image and the global motion vector to a first application process, wherein the first image is the previous image of the second image; deriving a first compensated image and a second compensated image by performing a lens distortion compensation process on the first image and the second image respectively; deriving a compensated global motion vector corresponding to the first compensated image and the second compensated image by transforming and correcting the global motion vector; and providing the first compensated image, the second compensated image, and the compensated global motion vector to a second application process.

10 Claims, 4 Drawing Sheets

METHOD FOR IMAGE PROCESSING AND APPARATUS USING THE SAME

CROSS-REFERENCE TO RELATED APPLICATION

This application claims the priority benefit of Taiwan application serial no. 101102387, filed on Jan. 20, 2012. The entirety of the above-mentioned patent application is hereby incorporated by reference herein and made a part of this specification.

BACKGROUND OF THE INVENTION

1. Technical Field

The invention relates generally to an image processing method and an apparatus using the same, and more particularly to a method of motion estimation and an apparatus using the same.

2. Related Art

Generally speaking, for an image capturing apparatus such as a digital camera or a video camera, when the images directly extracted from a photosensitive device with the lenses in the image capturing apparatus all exhibit a certain degree of lens distortion, a lens distortion compensation operation is typically performed by the image capturing apparatus to compensate the lens distortion before an image output step or other image processing steps, such that the output images are acceptable to a user.

FIG. 1 is a schematic diagram illustrating a conventional imaging process for compensating lens distortion. Referring to FIG. 1, a first image IMG1 and a second image IMG2 extracted from the photosensitive device at adjacent time points are typically in the Bayer pattern format. In some image application processes, such as an image application processing 110 in FIG. 1, since the characteristics of the process is more suitable for the Bayer pattern format, the image application process is performed on the images (e.g., the first and second images IMG1 and IMG2). The image application processing step is, for example, a 3D noise reduction process. Since the pixel components directly corresponding to the noise reduction content are the RGB components in the pixels, therefore the 3D noise reduction process is more suitable for the Bayer pattern format.

Thereafter, during a basic image process 120, besides performing basic image content adjustment on the first and second images IMG1 and IMG2, the image format is also transformed from the Bayer pattern format of the first and second images IMG1 and IMG2 to a YUV pattern format. Accordingly, a first compensated image CIMG1 and a second compensated image CIMG2 can be derived by performing a lens distortion compensation process on the first image IMG1 and the second image IMG2. An image application process 140 suitable for the compensated images and the YUV format receives the first compensated image CIMG1 and the second compensated image CIMG2 for processing. Whether used before the lens distortion compensation process 130 (e.g. in the image application process 110) or in the image application process thereafter (e.g. in the image application process 140), motion estimation is one of the widely adopted techniques. The motion estimation processes 111 and 141 respectively provide the motion vector estimation content in the image application processes 110 and 140, including the local motion vectors in each block between the first image IMG1 and the second image IMG2, as well as the entire global motion vector.

In conventional techniques, the motion estimation process 141 can be derived from a data access route r1 or a data access route r2. Since the motion estimation process 141 derives the motion vector estimation content through the data access route r1, the motion estimation process 141 directly references the estimation result of the motion estimation process 111. Although this method saves on the calculation bandwidth and the power consumption, the content of each block and the corresponding location are altered before and after the lens distortion compensation process 130. Accordingly, the motion vector estimation content obtained from the motion estimation process 111 through the data access route r1 has a specific error compared to the first image IMG1 and IMG2 after the compensation process. Therefore, the actual motion vectors of the compensated images cannot be accurately reflected. From another perspective, the motion estimation process 140 may also obtain the first and second images IMG1 and IMG2 after the compensation process through the data access route r2, in order to calculate again the motion vector estimation content of the two compensated images. However, although a more accurate content can be obtained, unfavorable amounts of calculation and power are wasted in the process. Therefore, how to accurately obtain motion vector estimation results of images that have been lens distortion compensated is currently an important area in this field.

SUMMARY OF THE INVENTION

The invention provides an image processing method and an apparatus using the same, capable of using the motion vector estimation results obtained before lens distortion compensation is performed on the digital images, and deriving motion vector estimation results directly corresponding to the lens distortion compensated images by transformation and correction.

The invention provides an image processing method including the following steps. Firstly, a global motion vector is derived between a first image and a second image, and the first image, the second image, and the global motion vector are provided to a first application process, in which the first image is a previous image of the second image. Thereafter, a first compensated image and a second compensated image are derived by respectively performing a lens distortion compensation process on the first image and the second image. Next, a compensated global motion vector corresponding to the first compensated image and the second compensated image is derived by transforming and correcting the global motion vector. The first compensated image, the second compensated image, and the compensated global motion vector are provided to a second application process.

The invention provides an image processing apparatus adapted for using an image processing method, including a memory and a processor. The memory registers a first image and a second image. The processor is coupled to the memory. The processor receives the first image and the second image from the memory, derives a global motion vector between the first image and the second image, and executes a first application process using the first image, the second image, and the global motion vector. Moreover, the processor registers a first compensated image and a second compensated image in the memory, in which the first compensated image and the second compensated image are derived by respectively performing a lens distortion compensation process on the first image and the second image. The processor derives a compensated global motion vector corresponding to the first compensated image and the second compensated image by transforming and correcting the global motion vector. Additionally, the processor executes a second application process by using the first compensated image, the second compensated image, and the compensated global motion vector.

In summary, some embodiments of the invention provide an image processing method and an apparatus using the same, capable of using the motion vector estimation results calculated before lens distortion compensation is performed, such as the global motion vector between two images. These motion vector estimation results may be transformed and corrected for use by the image application processes after the lens distortion compensation process.

Several exemplary embodiments accompanied with figures are described in detail below to further describe the disclosure in details.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 2:
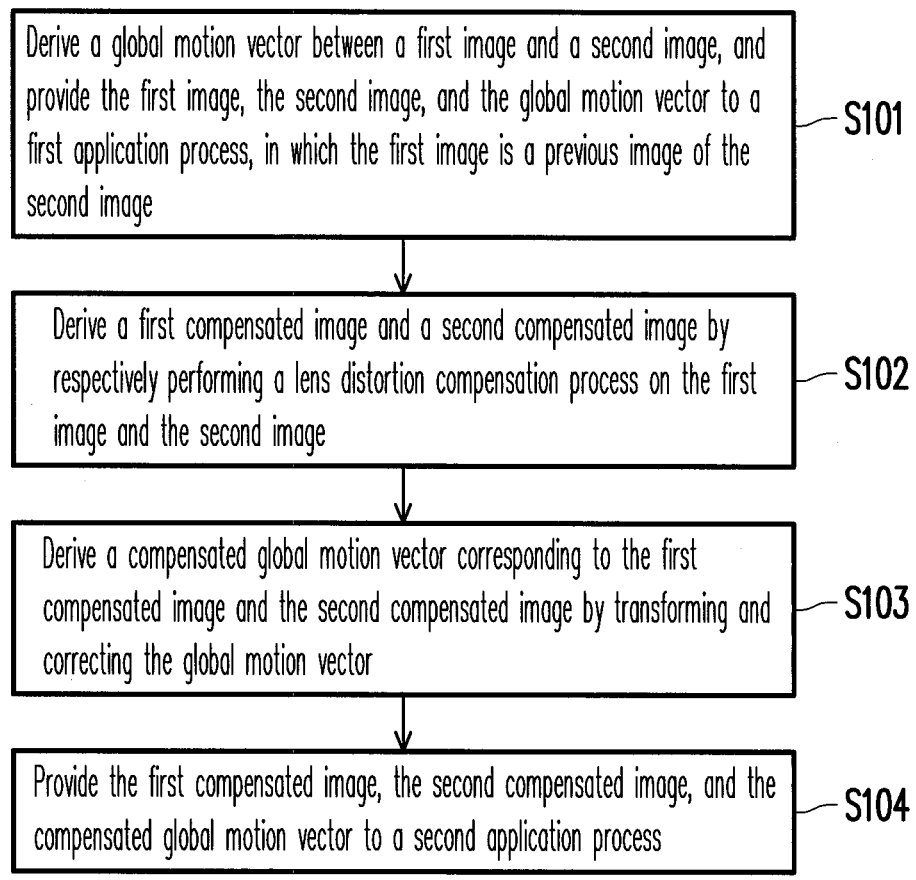
FIG. 2 is a flow chart of an image processing method according to an embodiment of the invention.

FIG. 2 is a flow chart of an image processing method according to an embodiment of the invention. Referring to FIG. 2, in a Step S101, a global motion vector is derived between a first image and a second image, and the first image, the second image, and the global motion vector are provided to a first application process, in which the first image is a previous image of the second image. Thereafter, in a Step S102, a first compensated image and a second compensated image are derived by respectively performing a lens distortion compensation process on the first image and the second image. Next, in a Step S103, a compensated global motion vector corresponding to the first compensated image and the second compensated image is derived by transforming and correcting the global motion vector. In a Step S104, the first compensated image, the second compensated image, and the compensated global motion vector are provided to a second application process. The following are detailed descriptions of an embodiment of the invention in association with the accompanied figures.

Figure 1:
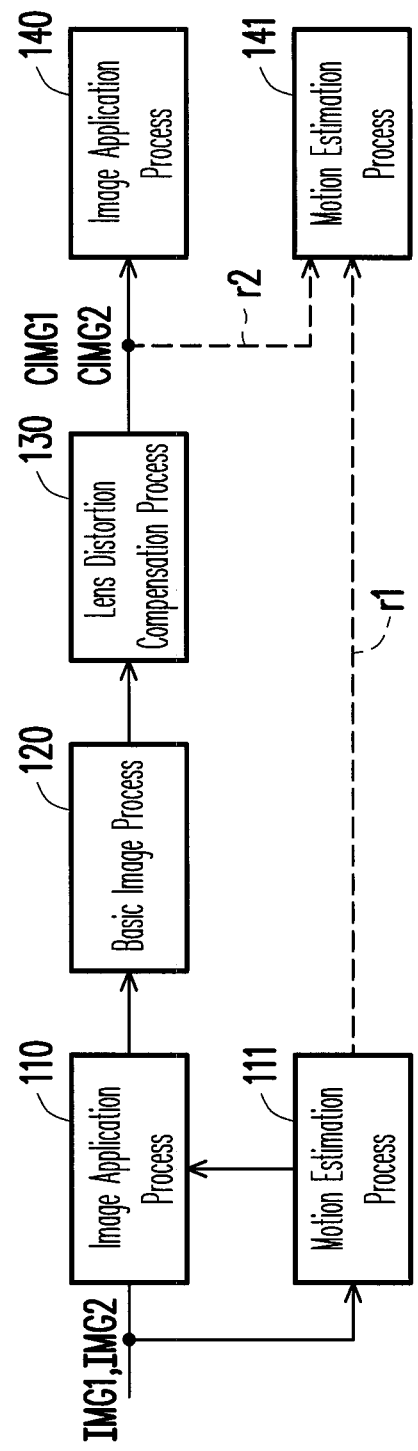
FIG. 1 is a schematic diagram illustrating a conventional imaging process for compensating lens distortion.
Figure 3:
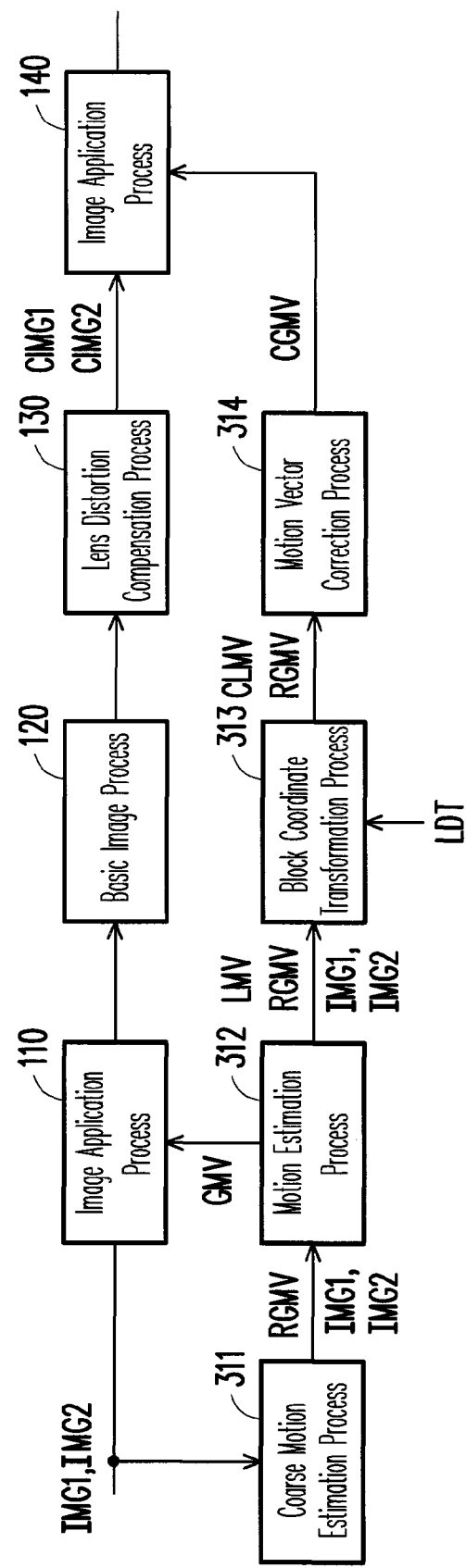
FIG. 3 is a flow chart of an image processing method according to an embodiment of the invention.

FIG. 3 is a flow chart of an image processing method according to an embodiment of the invention, in which the image application processes 110 to 140 have been previously described for FIG. 1, and therefore further elaboration thereof is omitted hereafter. It should be noted, however, that although the basic image process 120 transforms the first image IMG1 and the second image IMG2 from the Bayer pattern format to the YUV pattern format, the pattern formats are set in accordance with the implementation, and therefore is not limited to the two aforementioned formats.

Referring to FIG. 3, during a coarse motion estimation process 311, coarse motion estimation is performed on the first image IMG1 and the second image IMG2. In the present embodiment, the process of coarse motion estimation includes first respectively generating a first thumbnail of the first image IMG1 and a second thumbnail of the second image IMG2 according to the first image IMG1 and the second image IMG2. Using a block in the second thumbnail as a search unit, the corresponding block on the first thumbnail is searched, so as to calculate a coarse local motion vector for each block. After deriving the coarse local motion vector for each block in the second thumbnail, a coarse global motion vector RGMV is derived by using voting, averaging, or other judging mechanisms. The judging mechanism for determining the coarse global motion vector and the configuration thereof may be adjusted according to actual circumstances, and therefore the invention is not limited to the aforementioned judging mechanisms.

Using a block as a search unit to search for the motion vector estimation of the corresponding block in the first thumbnail may be implemented by a plurality of ways. For example, in the present embodiment, a sum of absolute difference (SAD) is derived at a location on a first predetermined size area of the first thumbnail by calculating an absolute difference of pixel values of corresponding stacking locations by shifting one pixel at a time, and summing the pixel differences in the block. Next, the SAD values of all locations in the first predetermined size area are compared, in which the location having the smallest SAD value is the location of the corresponding block. The coarse local motion vector is then calculated by using a distance between the block in the second image IMG2 and the corresponding block in the first image IMG1. Moreover, the first predetermined size area and the block size may be adjusted according to actual circumstances. The methods of motion estimation are also not limited to the afore-described methods.

Thereafter, a motion estimation process 312 receives the first image IMG1, the second image IMG2, and the coarse global motion vector RGMV from the coarse motion estimation process 311, and the global motion vector between the first image IMG1 and the second image IMG2 is derived by estimation according to the coarse global motion vector RGMV. In the present embodiment, each block in the second image IMG2 is shifted to the corresponding location according to the coarse global motion vector RGMV. Moreover, in a second predetermined size area around the corresponding location of the first image IMG1, the corresponding block is searched by the method which obtained the coarse global motion vector, so as to derive the local motion vectors of each block in the second image IMG2. Thereafter, the coarse global motion vector RGMV is subtracted from each local motion vector, thereby deriving the relative local motion vectors of each block in the second image IMG2.

After the relative local motion vectors of each block in the second image IMG2 have been calculated, the global relative local motion vector is derived by using voting, averaging, or other judging mechanisms. By adding the global relative local motion vector to the coarse global motion vector RGMV, a global motion vector GMV of the first image IMG1 and the second image IMG2 can be derived. It should be noted that, in some embodiments, the relative local motion vectors of each block in the second image IMG2 may be a scattered data. In other words, it is not possible to determine a definite motion direction relative to the coarse global motion vector from the relative local motion vector values. In the above described condition, the judgment mechanism may ignore the calculation result of the relative local motion vector, and directly use the coarse global motion vector RGMV as the global motion vector GMV of the first image IMG1 and the second image IMG2. In order to prevent the condition described above from occurring, the second predetermined size area and the setting of the judging mechanism may be adjusted, such that the global motion vector GMV obtained by the adjustment is an optimized result.

A block coordinate transformation process 313 receives the first image IMG1, the second image IMG2, and the local motion vectors LMV of each block in the second IMG2 from the motion estimation process 312, and transforms the coordinates of these blocks. In the present embodiment, a center coordinate of each block serves as the representative point of the block for transformation. However, in other embodiments, the coordinates of other pixel points may also be used as reference, for example a top left point of the block may serve as the representative point of the transformation. First, the center coordinate of each block in the second image IMG2 is added to each corresponding local motion vector LMV, so as to derive a center coordinate of the corresponding block in the first image IMG1 for each block.

Thereafter, a compensated local motion vector corresponding to each block is derived by using a coordinate transformation formula to transform the center coordinates of the blocks in the second image IMG2 and the center coordinates of the corresponding blocks in the first image IMG1. The coordinate transformation formula corresponds to an operation of the lens distortion compensation process, for transforming the coordinates of the images before the compensation to the coordinates of the compensated images. In the present embodiment, the transformation results have been calculated in advance by using the coordinate transformation formula to obtain a correction table LDT. When transformation of the image coordinates before and after the lens distortion compensation is required, the transformation results may be derived by directly referring to the correction table LDT in a look up table method.

It should be noted that, in order to save on memory space, the contents stored in the correction table LDT may be the transformation results of a portion of the coordinates in the images by skipping data points (e.g., storing the transformation result of one data point every 16 pixels). When the correction table LDT does not have the coordinate of the transformation result for the coordinate point requiring transformation (e.g. the center coordinate of the block or the corresponding block), the needed coordinate of the transformation result may be derived by using an interpolation method, such as bilinear interpolation, on a neighboring point having a transformation result. However, the invention is not limited to the aforementioned methods for storing the correction table and the look up table operation.

After obtaining the center coordinates corresponding to the compensated images after transformation for each block and the corresponding block, the compensated local motion vectors CLMV of each block of the second compensated image CIMG2 and the corresponding block in the first compensated image CIMG1 may be derived according to the transformed block center coordinates and the transformed corresponding block center coordinates. In a motion vector correction process 314, a compensated global motion vector CGMV between the first compensated image CIMG1 and the second compensated image CIMG2 is derived according to the compensated local motion vector CLMV.

In the present embodiment, by adopting a step similar to the motion estimation process 312, the coarse global motion vector RGMV is subtracted from a plurality of compensated local motion vectors CLMV, thereby deriving the compensated relative local motion vectors of each block. Thereafter, a magnitude of the compensated relative global motion vector is determined by using voting, averaging, or other judging mechanisms according to the relative local motion vectors of each block. By adding the compensated global relative local motion vector to the coarse global motion vector RGMV, the compensated global motion vector CGMV can be derived. Similar to the determination of the global motion vector in the motion estimation process 312, when the relative local motion vector values are overly scattered and an overall definite motion direction cannot be determined, the operation based on the coarse global motion vector RGMV ensures that, even though the compensated global motion vector cannot be totally accurately estimated, the motion estimation is not affected by scattered relative motion vectors.

Lastly, the first compensated image CIMG1, the second compensated image CIMG2, and the compensated global motion vector CGMV are provided to the image application process 140, in which the image application process can 140 may apply the information from the compensated global motion vector CGMV to complete the related image processing thereof.

Figure 4:
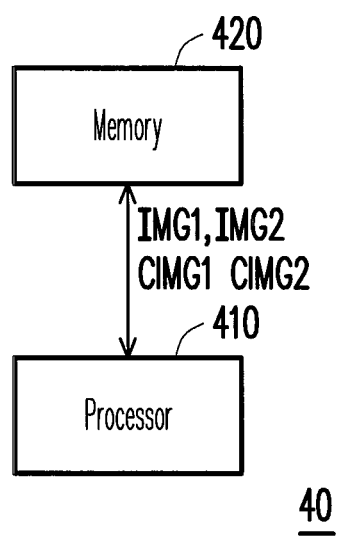
FIG. 4 is a block diagram of an image processing apparatus according to an embodiment of the invention.

An embodiment of the invention provides an image processing apparatus suitable for using the afore-described image processing method. FIG. 4 is a block diagram of an image processing apparatus according to an embodiment of the invention. Referring to FIG. 4, an image processing apparatus 40 includes a processor 410 and a memory 420. The memory 420 stores the first image IMG1 and the second image IMG2. The processor 410 is coupled to the memory 420 and receives the first image IMG1 and the second image IMG2 from the memory 420. The processor 410 derives the global motion vector between the first image IMG1 and the second image IMG2, and executes the first application process by using the first image IMG1, the second image IMG2, and the global motion vector.

Moreover, the processor 410 registers the first compensated image CIMG1 and the second compensated image CIMG2 in the memory 420, in which the compensated images CIMG1 and CIMG2 are derived by respectively performing the lens distortion compensation process on the first image IMG1 and the second image IMG2. The processor 410 derives the compensated global motion vector corresponding to the first compensated image CIMG1 and the second compensated image CIMG2 by transforming and correcting the global motion vector. The processor 410 employs first compensated image CIMG1, the second compensated image CIMG2, and the compensated global motion vector to execute the second application process.

Since reference for the detailed implementation of the image processing apparatus 40 in the invention may be obtained from the teachings, suggestions, and implementation description of the above embodiments, further elaboration thereof is omitted hereafter. It should be noted that, the data values in the afore-described embodiments, for example the coarse global motion vector RGMV in the embodiment depicted in FIG. 3, the local motion vectors LMV of each block, and the data values in the correction table LDT are stored in the memory 420 for access by the processor 410.

In view of the foregoing, some embodiments of the invention provide an image processing method and an apparatus using the same. In the motion estimation calculation of the images before the lens distortion compensation process, a coarse motion estimation process is performed first, the more accurate local motion vector and the global motion vector are calculated, and the local motion vector is transformed to correspond to the images after the lens distortion compensation. Thereafter, the global motion vector is corrected in accordance with the transformed local motion vector and the coarse global motion vector to correspond to the compensated images. Accordingly, the image application processes of the motion estimation before and after the lens distortion compensation process can directly apply the global motion vector before or after the transformation by using the aforedescribed transformation relationship, thereby preventing too many complex calculation steps. Moreover, the inaccuracy resulting from an image application process after the lens distortion compensation directly applying the motion estimation calculated before the distortion compensation can be avoided.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An image processing method, comprising:
   deriving a coarse global motion vector by performing a coarse motion estimation process between a first image and a second image, wherein the first image is a previous image of the second image, and the first image comprises a plurality of blocks and the second image comprises a plurality of blocks, wherein the step of performing the coarse motion estimation process between the first image and the second image comprises:
   respectively generating a first thumbnail and a second thumbnail according to the first image and the second image, wherein a size of the first thumbnail and the second thumbnail is smaller than the first image and the second image, and the first thumbnail comprises a plurality of blocks and the second thumbnail comprises a plurality of blocks;
   according to the first thumbnail and the second thumbnail, respectively deriving a plurality of coarse local motion vectors between the blocks in the second thumbnail and a plurality of corresponding blocks searched for in the first thumbnail; and
   deriving the coarse global motion vector according to the coarse local motion vectors;
   deriving a global motion vector between the first image and the second image by estimation according to the coarse global motion vector and providing the first image, the second image, and the global motion vector to a first application process;
   deriving a first compensated image and a second compensated image by respectively performing a lens distortion compensation process on the first image and the second image;
   deriving a compensated global motion vector corresponding to the first compensated image and the second compensated image by transforming and correcting the global motion vector; and
   providing the first compensated image, the second compensated image, and the compensated global motion vector to a second application process.

2. The image processing method as claimed in claim 1, wherein before the step of respectively performing the lens distortion compensation process on the first image and the second image, the method further comprises:
   performing a basic image process on the first image and the second image, wherein the basic image process comprises transforming the first image and the second image from a first file format to a second file format.

3. The image processing method as claimed in claim 1, wherein the step of deriving the global motion vector between the first image and the second image according to the coarse global motion vector comprises:
   according to the coarse global motion vector, deriving a plurality of local motion vectors between the blocks in the second image and the corresponding blocks in the first image; and
   deriving the global motion vector according to the local motion vectors through a first voting mechanism.

4. The image processing method as claimed in claim 3, wherein the step of deriving the compensated global motion vector by transforming and correcting the global motion vector comprises:
   transforming the center coordinates of the blocks in the second image into a plurality of compensated coordinates corresponding to the second compensated image by using a coordinate transformation formula;
   transforming the center coordinates of the corresponding blocks in the first image into a plurality of compensated corresponding coordinates in the first compensated image by using the coordinate transformation formula;
   deriving a plurality of compensated local motion vectors by using the compensated coordinates of the blocks in the second image, and the compensated corresponding coordinates of the corresponding blocks in the second image; and
   deriving the compensated global motion vector according to the compensated local motion vectors and the coarse global motion vector through a second voting mechanism.

5. The image processing method as claimed in claim 4, wherein the steps of transforming the center coordinates of the blocks in the second image and transforming the center coordinates of the corresponding blocks in the first image comprise:
   according to a correction table, respectively transforming the center coordinates of the blocks in the second image and the center coordinates of the corresponding blocks in the first image by a look up table method.

6. An image processing apparatus adapted for using an image processing method, comprising:
   a memory registering a first image and a second image;
   a processor coupled to the memory, receiving the first image and the second image from the memory, deriving a coarse global motion vector by performing a coarse motion estimation process between the first image and the second image, wherein the processor respectively generates a first thumbnail and a second thumbnail according to the first image and the second image, wherein a size of the first thumbnail and the second thumbnail is smaller than the first image and the second image, and the first thumbnail comprises a plurality of blocks and the second thumbnail comprises a plurality of blocks, respectively derives a plurality of coarse local motion vectors between the blocks in the second thumbnail and a plurality of corresponding blocks searched for in the first thumbnail according to the first thumbnail and the second thumbnail, and derives the coarse global motion vector according to the coarse local motion vector;
   the processor derives a global motion vector between the first image and the second image by estimation according to the coarse global motion vector, and executing a first application process using the first image, the second image, and the global motion vector;
   the processor registers a first compensated image and a second compensated image in the memory, the first compensated image and the second compensated image derived by respectively performing a lens distortion compensation process on the first image and the second image;

the processor derives a compensated global motion vector corresponding to the first compensated image and the second compensated image by transforming and correcting the global motion vector; and the processor executes a second application process by using the first compensated image, the second compensated image, and the compensated global motion vector.

7. The image processing apparatus as claimed in claim 6, wherein:

before the processor performs the lens distortion compensation process on the first image and the second image, a basic image process is performed on the first image and the second image, wherein the basic image process comprises transforming the first image and the second image from a first file format to a second file format.

8. The image processing apparatus as claimed in claim 6, wherein:

according to the coarse global motion vector, the processor derives a plurality of local motion vectors between the blocks in the second image and the corresponding blocks in the first image, wherein the corresponding blocks are derived by a local motion vector search method according to the blocks in the second image; and the processor derives the global motion vector according to the local motion vectors through a first voting mechanism.

9. The image processing apparatus as claimed in claim 8, wherein:

the processor transforms the center coordinates of the blocks in the second image into a plurality of compensated coordinates corresponding to the second compensated image by using a coordinate transformation formula;

the processor transforms the center coordinates of the corresponding blocks in the first image into a plurality of compensated corresponding coordinates of the first compensated image by using the coordinate transformation formula;

the processor derives a plurality of compensated local motion vectors by using the compensated coordinates of the blocks in the second image, and the compensated corresponding coordinates of the corresponding blocks in the second image; and the processor derives the compensated global motion vector according to the compensated local motion vectors and the coarse global motion vector through a second voting mechanism.

10. The image processing apparatus as claimed in claim 9, wherein:

the memory stores a correction table;

the processor reads the correction table from the memory, and according to the correction table, the processor respectively transforms the center coordinates of the blocks in the second image and the center coordinates of the corresponding blocks in the first image by a look up table method.

* * * * *